(12) United States Patent
Bareis (10) Patent No.: US 9,638,140 B2
(45) Date of Patent: May 2, 2017

(54) LOW PRESSURE VALVE, FOR CONTROLLING EXHAUST GAS RECIRCULATION

(71) Applicant: Bernd Bareis, Taeferrot-Utzstetten (DE)

(72) Inventor: Bernd Bareis, Taeferrot-Utzstetten (DE)

(73) Assignee: Gustav Wahler GmbH u. Co. KG, Esslingen (DE)

( * ) Notice: Subject to any disclaimer, the term of this patent is extended or adjusted under 35 U.S.C. 154(b) by 864 days.

(21) Appl. No.: 13/680,418

(22) Filed: Nov. 19, 2012

(65) Prior Publication Data

US 2013/0167815 A1     Jul. 4, 2013

(30) Foreign Application Priority Data

Nov. 23, 2011 (DE) .................. 10 2011 119 139

(51) Int. Cl.
    *F02M 25/07*     (2006.01)
    *F02D 9/10*     (2006.01)
    (Continued)

(52) U.S. Cl.
    CPC ......... *F02M 25/0773* (2013.01); *F02B 47/08* (2013.01); *F02D 9/106* (2013.01);
    (Continued)

(58) Field of Classification Search
    CPC ..... F02B 47/08; F02D 9/106; F02M 25/0756; F02M 25/0773; F02M 25/0793;
    (Continued)

(56) References Cited

U.S. PATENT DOCUMENTS

| 2,802,896 A | * | 8/1957 | Tiernan | ................... H01C 1/02 |
|---|---|---|---|---|
| | | | | 174/110 S |
| 4,915,083 A | * | 4/1990 | Hewette | ................. F02M 26/72 |
| | | | | 123/568.24 |

(Continued)

FOREIGN PATENT DOCUMENTS

| DE | 103 44 218 | 4/2005 |
|---|---|---|
| DE | 10 2006 039 827 | 2/2008 |

(Continued)

*Primary Examiner* — Carlos A Rivera
*Assistant Examiner* — Carl Staubach
(74) *Attorney, Agent, or Firm* — Michael J. Striker (57) ABSTRACT

A low pressure valve for controlling exhaust gas recirculation in an internal combustion engine for a vehicle includes a housing, which contains a channel section for exhaust gas guidance, and a valve element disposed in the housing to control the exhaust gas passage in the channel section. An actuating drive is mounted on the housing and adjusts the valve element. The actuating drive is formed of an electromagnetic rotary actuator with a drive shaft thereof. The drive shaft is routed in an extended manner out of a rotary actuator housing and is in the form of an actuating shaft. The actuating shaft extends continuously to the housing and protrudes into the housing transversely to the flow direction, engages therein at the valve element in a non-rotatable manner and can be rotationally adjusted about the axis to actuate the valve element.

24 Claims, 4 Drawing Sheets

(51) Int. Cl.
*F02B 47/08* (2006.01)
*F16K 1/22* (2006.01)
*F02M 26/48* (2016.01)
*F02M 26/54* (2016.01)
*F02M 26/70* (2016.01)
*F02M 26/72* (2016.01)

(52) U.S. Cl.
CPC ............ *F02M 26/48* (2016.02); *F02M 26/54* (2016.02); *F02M 26/70* (2016.02); *F16K 1/221* (2013.01); *F02M 26/72* (2016.02); *Y02T 10/121* (2013.01)

(58) Field of Classification Search
CPC   F02M 25/0794; F02M 25/0797; F16K 1/221; Y02T 10/121
USPC ............... 701/108; 123/337, 568.11, 568.16, 123/568.21–568.24, 672; 251/129.11, 251/129.16, 129.18, 129.2, 306; 137/527, 137/540; 60/278, 279
See application file for complete search history.

(56)   References Cited

U.S. PATENT DOCUMENTS

| | | | | |
|---|---|---|---|---|
| 5,092,296 A * | 3/1992 | Gunter | ................... | F02D 11/10 123/337 |
| 5,148,787 A * | 9/1992 | Ganser | ................ | F02D 9/1065 123/337 |
| 5,531,205 A * | 7/1996 | Cook | ...................... | F02D 9/101 123/568.24 |
| 5,842,680 A * | 12/1998 | Bustamante | .......... | F16K 31/041 251/129.11 |
| 6,164,623 A * | 12/2000 | Ito | ........................ | F02D 9/1065 123/337 |
| 6,484,704 B2 * | 11/2002 | Cook | ................ | F02M 25/0773 123/568.16 |
| 6,505,643 B2 * | 1/2003 | Scholten | ............... | F02D 9/1035 123/337 |
| 6,541,881 B1 * | 4/2003 | Turner | .................... | F02D 11/10 251/129.11 |
| 6,622,674 B2 * | 9/2003 | Kobayashi | ............... | F01L 1/022 123/90.15 |
| 6,932,051 B2 * | 8/2005 | Soshino | ................ | F02D 9/1045 123/337 |
| 7,047,936 B2 * | 5/2006 | Suzuki | .................. | F02D 9/1035 123/337 |
| 7,114,486 B2 * | 10/2006 | Hannewald | ........... | F02D 9/1025 123/337 |
| 7,168,682 B2 * | 1/2007 | Nanba | ................... | F02D 9/1045 251/305 |
| 7,205,690 B2 * | 4/2007 | Hatano | ................... | F16K 31/04 123/568.24 |
| 7,322,560 B2 * | 1/2008 | Gauss | .................. | F16K 31/047 251/129.11 |
| 7,770,557 B2 * | 8/2010 | Ikeda | .................. | B29C 45/1671 123/337 |
| 7,895,993 B2 | 3/2011 | Weisz | | |
| 8,091,862 B2 * | 1/2012 | Palin | ....................... | F16K 1/221 251/298 |
| 8,191,861 B2 | 6/2012 | Elsaesser et al. | | |
| 8,316,830 B2 * | 11/2012 | Keefover | .............. | F02D 9/1035 123/568.21 |
| 8,616,242 B2 * | 12/2013 | Buseyne | ................... | F16K 1/22 137/625.31 |
| 8,763,987 B2 * | 7/2014 | Pisera | ..................... | F16K 1/221 137/15.06 |
| 2005/0183705 A1 * | 8/2005 | Nanba | ................... | F02D 9/1045 123/568.24 |
| 2006/0059903 A1 * | 3/2006 | Gerards | .................... | F16K 1/22 60/324 |
| 2007/0107708 A1 * | 5/2007 | Uchiyama | ............. | F02D 9/1065 123/568.18 |
| 2008/0149185 A1 * | 6/2008 | Walter | ............... | F02M 25/0714 137/38 |
| 2011/0031425 A1 * | 2/2011 | Tyler | ..................... | F16K 31/046 251/129.11 |

FOREIGN PATENT DOCUMENTS

| | | |
|---|---|---|
| DE | 10 2006 060 876 | 6/2008 |
| EP | 0 918 925 | 6/1999 |
| EP | 1 875 062 | 1/2008 |
| EP | 1 936 151 | 6/2008 |
| EP | 2 365 196 | 9/2011 |

\* cited by examiner

LOW PRESSURE VALVE, FOR CONTROLLING EXHAUST GAS RECIRCULATION

CROSS-REFERENCE TO A RELATED APPLICATION

The invention described and claimed hereinbelow is also described in German Patent Application DE 10 2011 119 139.2 filed on Nov. 23, 2011 . This German Patent Application, subject matter of which is incorporated herein by reference, provides the basis for a claim of priority of invention under 35 U.S.C. 119(a)-(d).

BACKGROUND OF THE INVENTION

The invention relates to a valve, more particularly, the invention relates to a low pressure valve for controlling exhaust gas recirculation within internal combustion engines comprising a housing formed with a channel section for exhaust gas guidance and including a valve element disposed in the housing and designed to control the exhaust gas passage in the channel section and an actuating drive mounted on the housing and is designed to adjust the valve element.

Valves of this type (sometimes referred to as exhaust gas recirculation valves) are typically disposed in exhaust gas recirculation systems in an exhaust gas return line for adjusting a quantity of the exhaust gas recirculated from the exhaust gas side to the fresh air side. The exhaust gas recirculation valve is therefore designed to adjust the exhaust gas recirculation quantity or the exhaust gas recirculation rate. The exhaust gas recirculation valve controls the exhaust gas quantity or exhaust gas rate as a function of operating parameters of an internal combustion engine. In a design and arrangement as a low pressure valve, the exhaust gas recirculation valve is located in a low pressure exhaust gas line connected to the outlet of an exhaust gas turbine and leads into a fresh air line, i.e. before entering a charge air compressor.

The exhaust gas recirculation valve also can be designed as turning valves, in which a rotary actuator actuates a shaft, by way of which a vane flap located in the channel section (as a valve element) is actuated. The actuating drives that are typically used are relatively large and heavy and costly. The same applies for the housing containing the valve element. The objective of regulation is to detect the particular position of the valve element and feed it to a regulating device, as an actual value. In known valves, the regulating device is complex. For that matter, the known exhaust gas recirculation valves require a great deal of installation space and are susceptible to interference and are subject to wear. The known exhaust gas recirculation valves do not ensure reliable function with high control accuracy over a long period of operation and use.

SUMMARY OF THE INVENTION

The present invention overcomes the shortcomings of the known arts, such as those mentioned above.

The present invention provides a exhaust gas recirculation valve in a compact design that realizes a valve that is wear-free and robust.

The present invention provides a exhaust gas recirculation valve of the present invention includes that the actuating drive is formed of an electromagnetic rotary actuator comprising a drive shaft thereof. The drive shaft is routed in an extended manner out of a rotary actuator housing and is designed as an actuating shaft that extends continuously to the housing and into the housing transversely to the flow direction and engages therein at the valve element in a non-rotatable manner. The drive shaft can be rotationally adjusted about the axis thereof in order to actuate the valve element. The valve element is formed of a circular flap, which is directed transversely to channel section and bears, in the closed position thereof, by way of edge regions thereof, against axial stop surfaces on both sides of the axis in the housing.

The exhaust gas recirculation valve advantageous in that the drive shaft of the rotary actuator is designed, in a continuously extended configuration, as an actuating shaft for the rotational actuation of the valve element, resulting in a low cost and a very compact design. In this form, the rotary actuator functions as a direct drive. Such a design creates the prerequisites for obtaining a contactless rotary position sensor unit for the direct sensing of the particular position of the valve element. The sensor element may take the form of a sensor magnet and is directly connected to the actuating shaft in a non-rotatable manner. Any coupling elements normally found therebetween are omitted. Direct sensing of the valve position, which is made possible by the design, results in high control accuracy using a simple, lightweight and low-cost design.

Moreover, the exhaust gas recirculation valve so designed is robust and wear-free, as it requires relatively few components and is relatively low-cost. High differential pressures are thereby possible in the region of the valve element and in the channel section without the risk of deformation or damage.

BRIEF DESCRIPTION OF THE DRAWINGS

Further features and advantages of the invention will become apparent from the description of embodiments that follows, with reference to the attached figures, wherein.

DETAILED DESCRIPTION OF THE PREFERRED EMBODIMENTS

The following is a detailed description of example embodiments of the invention depicted in the accompanying drawings. The example embodiments are presented in such detail as to clearly communicate the invention and are designed to make such embodiments obvious to a person of ordinary skill in the art. However, the amount of detail offered is not intended to limit the anticipated variations of embodiments; on the contrary, the intention is to cover all modifications, equivalents, and alternatives falling within the spirit and scope of the present invention, as defined by the appended claims.

One embodiment of a valve 10 for controlling exhaust gas recirculation in an internal combustion engine (e.g., a vehicle), is shown in FIGS. 1 to 5.

Figure 1:
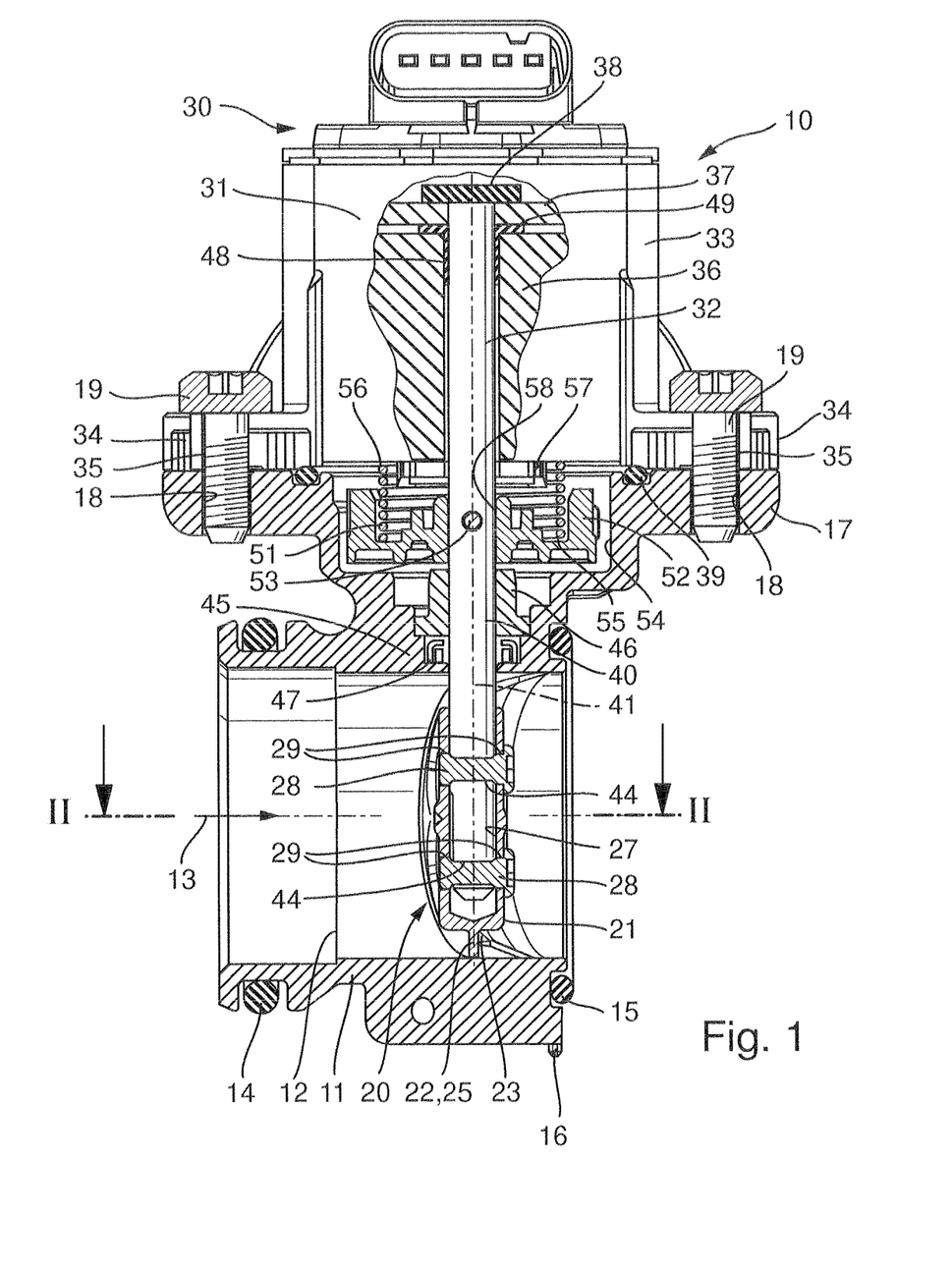
FIG. 1 shows a schematic sectional view of a valve for exhaust gas recirculation of the invention wherein a valve element is in a closed position.

The valve 10 is a low pressure valve. In low pressure exhaust gas recirculation, exhaust gas is withdrawn from a low pressure exhaust gas line in the flow direction of the exhaust gas downstream of an exhaust gas turbine and is fed via a low pressure exhaust gas recirculation line to a low pressure charge air line, which is connected to a charge air compressor.

Rather than as a low pressure valve, the valve 10 that is shown is also suitable for high pressure exhaust gas recirculation. In high pressure exhaust gas recirculation, exhaust gas is branched off from a high pressure exhaust gas line and is fed to a high pressure charge air line.

The valve 10 comprises a housing 11. The housing 11 contains a channel section 12 for exhaust gas guidance and to which exhaust gas is fed in the arrow direction 13. The housing 11 is substantially cylindrical, as is the inner channel section 12. The housing 11 is formed of a diecast part, more particularly an aluminum diecast part. The housing 11 comprises, in the region of the axial ends thereof on both sides, sealing rings 14 and 15. The sealing rings 14 and 15 are accommodated in grooves and via which a radial or axial seal occurs upon installation in a line, in a housing or the like. The sealing ring 14 is formed of an O ring. The sealing ring 15 is designed as a molded seal made of an elastomer, comprising at least one projection 16. Projection 16 protrudes radially from the housing 11, as a visual check for the presence of the sealing ring 15. A fastening flange 17, which is integral with the housing 11, is provided transversely to the channel section 12 at a distance therefrom. The fastening flange comprises a plurality of, e.g. two, fastening holes 18 for continuous fastening means 19, e.g. screws.

Furthermore, the valve 10 comprises a valve element 20. Valve element 20 is disposed in the housing 11 and is designed to control the exhaust gas passage in the channel section 12.

The valve 10 further comprises an actuating drive 30. The actuating drive 30 is installed in the housing 11 and designed to adjust the valve element 20. The actuating drive 30 is designed as a direct drive and formed of an electromagnetic rotary actuator 31 having a drive shaft 32. The rotary actuator 31 comprises a rotary actuator housing 33 made of plastic and having fastening tabs 34 integral therewith. The fastening tabs contain holes 35, which are aligned with the fastening holes 18 of the fastening flange 17, through which the fastening means 19 extend. The electromagnetic rotary actuator 31 contains, in the rotary actuator housing 33, a schematically indicated coil form 36 through which the drive shaft 32 extends. The electromagnetic rotary actuator 31 also contains a magnetic rotor 37, which is non-rotatably connected to the drive shaft 32. The mode of operation of the electromagnetic rotary actuator 31 is known and requires no further description.

Seated at the upper end (as seen in FIG. 1) of the drive shaft 32 is a schematically indicated sensor element 38. Sensor element 38 is non-rotatably connected to the drive shaft and embodies a permanent magnet. The sensor element is part of a contactless rotary position sensor device for the direct sensing of the particular position of the valve element 20. The rotary actuator 31 is seated with the rotary actuator housing 33 thereof on the fastening flange 17, in a sealed manner by way of a sealing ring 39, e.g., an O ring. The rotary actuator 31 is fixedly but detachably connected thereto via the fastening means 19. The fastening holes 18 is in the form of threaded holes, for example, into which the fastening means 19, e.g., screws, comprising a threaded step are screwed.

Figure 5:
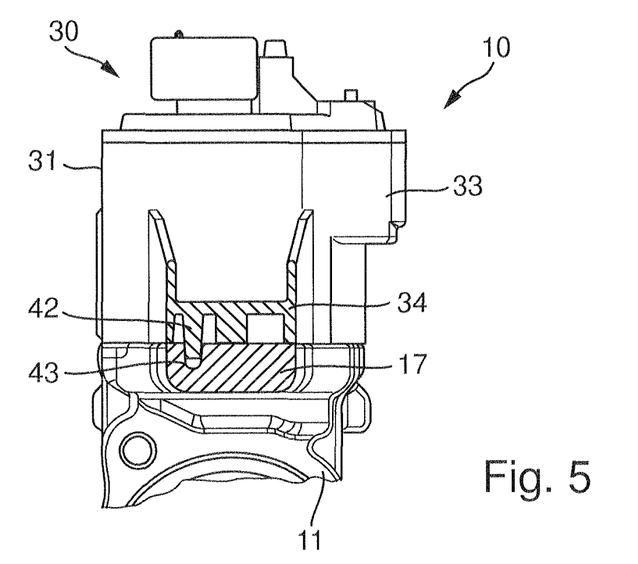
FIG. 5 shows a partial sectional side view of a further detail from the valve depicted in FIG. 1.

As shown in FIG. 5, an overhanging location pin 42 is integrally formed on the rotary actuator housing 33, e.g., of a fastening tab 34 thereof. The location pin engages in a matching groove 43 of the fastening flange 17 in a form-fit manner and is used to lock rotation between the rotary actuator housing 33 and the housing 11, more particularly the fastening flange 17 thereof.

As shown in FIG. 1, the drive shaft 32 of the rotary actuator 31 is routed in an extended manner out of the rotary actuator housing 33. The drive shaft 32 takes a form of an actuating shaft 40, which extends continuously to the housing 11 and protrudes into the housing 11 transversely to the flow direction, engages therein at the valve element 20 in a non-rotatable manner and is rotationally adjustable about the axis 41 thereof in order to actuate the valve element 20.

The valve element 20 is formed of a circular flap 21. The circular flap 21 is directed transversely to the channel section 12 and, in the closed position (shown in FIG. 1) bears via edge regions 22 thereof against axial stop surfaces 23, 24 on both sides of the axis 41 in the housing 11. In the opened position of the flap 21 (depicted in FIG. 2), the flap is not directed transversely to the channel section 12 in such a way that the exhaust gas passage would be blocked. Instead, the flap 21 is oriented approximately longitudinally.

Figure 2:
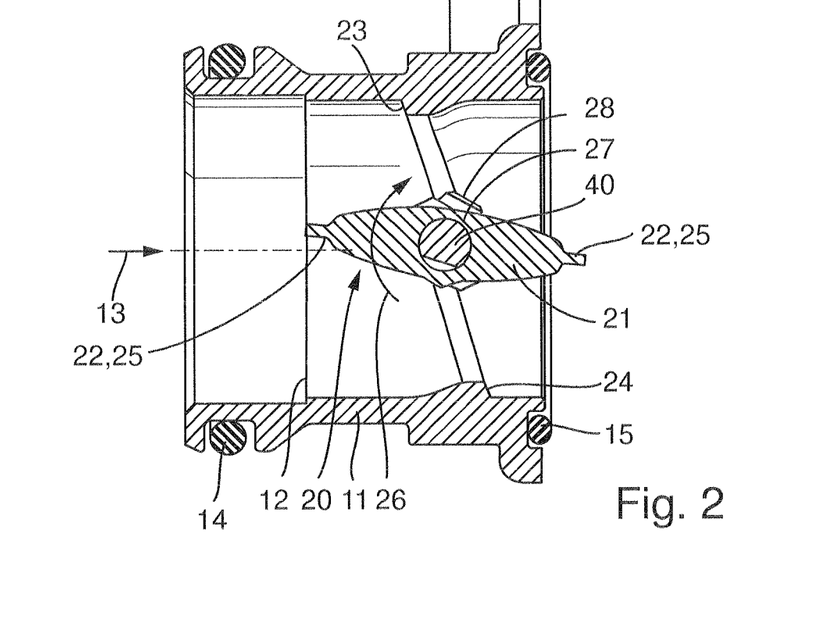
FIG. 2 shows a schematic sectional view along the line II-II of the valve depicted in FIG. 1, but wherein the valve element is located in the opened position.

The housing-side axial stop surfaces 23, 24 are contained within a plane that extends obliquely at an acute angle with respect to a diagonal of the channel section 12, as shown more particularly in FIG. 2. The stop surfaces 23, 24 extend approximately in the shape of a semicircle. As edge regions 22, the flap 21 comprises a circumferential lip 25, e.g., which has a smaller cross-sectional thickness, on the outer edge. The circumferential lip 25 of flap 21 axially bears, in the closed position thereof, against the housing-side, axial stop surfaces 23, 24 squarely and at least substantially in a sealing manner. To actuate the flap 21 into the closed position thereof (according to FIG. 1), starting from the opened position (according to FIG. 2), the flap 21 is rotationally adjusted using the rotary actuator 31 in the arrow direction 26 (in the clockwise direction) so that the lips 25 come to rest squarely axially against the assigned axial stop surfaces 23, 24.

Flap 21 contains a diametrically extending inner bore 27, in which an assigned end region of the actuating shaft 40 is accommodated in a form-fit manner. The diametrical bore 27 is in the form of a blind hole in the embodiment according to FIGS. 1 to 5. An assigned end region of the actuating shaft 40 is inserted into the bore 27, but does not extend beyond the outer edge of the flap 21. The flap 21 is fastened to the actuating shaft 40 using one or more fastening means 28, preferably in a form of screws. The fastening means 28 are directed transversely to the axis and extend through transversely extending bores 29 in the flap 21 and 44 in the actuating shaft 40. The bores 44 in the actuating shaft 40 are in the form of diametric threaded bores, for example, while the bores 29 in the flap 21 are in the form of through-bores. The fastening means 28 are in the form of threaded screws and are secured at one end in the region of the bores 29 with respect to the flap 21, e.g., by staking. Such arrangement is indicated in FIG. 1 via a slight thickened area of the left (as shown there) end of the fastening means 28. It is understood that the invention is limited thereto, however, and that other securing means also can be used.

The valve element 20, and more particularly the flap 21, is formed of a precision-cast part. Preferably same is formed of stainless steel. As a result, simple, low-cost manufacture of the valve element 20 is made possible. In addition, the prerequisite is created for obtaining the bore 27 in the flap 21 with a diameter that corresponds to the diameter of the actuating shaft 40, which results from the diameter Of the continuous drive shaft 32. The diameter can therefore be retained for the actuating shaft 40. As such, it is unnecessary to reduce the diameter, which would be accompanied by a weakening of the strength and stability of the actuating shaft 40. The shaft region of the actuating shaft 40 extending into the channel section 12 is so stable that the freely overhanging actuating shaft 40 is not at risk of deformation even from the greater differential pressures on both sides of the flap 21.

The actuating shaft 40 (see FIGS. 1-5) extends through the housing 11 only in a housing region labeled 45. The housing region 45 is located between the flap 21 and the rotary actuator 31, and extends together with the flap 21 into the channel section 12. The actuating shaft 40 is supported in the housing 11 in only a single radial bearing 46, which is disposed in said housing region 45, as viewed along the axis 41 on the top (FIG. 1) of the flap 21 and at a distance therefrom. The radial bearing 46 is preferably in the form of a sliding bearing. The radial bearing is sealed in the housing 11, more particularly the housing region 45, toward the channel section 12 by way of a sealing ring 47. Sealing ring 47 is preferably made of a peroxide-cured plastic, e.g., FKM. The radial bearing 46 is formed, for example, of a bushing made of plastic. The radial bearing 46 is securely protected via the sealing ring 47 against penetration by moisture, e.g. exhaust gas condensate, and against ice formation.

As shown FIG. 1, the actuating shaft 40, via the upper end section of the drive shaft 32 thereof contained in the rotary actuator 31, is supported in the rotary actuator 31 by way of a radial bearing 48 and an axial bearing 49, in fact via the magnetic rotor 37 resting thereon in an axial direction.

Support of the actuating shaft 40 via the two axially separated radial bearings 46 and 48 results in good and secure radial support of the actuating shaft 40 despite the section of the actuating shaft 40 that overhangs freely into the channel section 12 and carries the flap 21. In the closed position of the flap 21, large differential pressures, which act on the flap 21, also are reliably managed without deformation of the actuating shaft 40 comprising the flap 21. The flap 21, which bears in the closed position via the lip 25 against the axial stop surfaces 23, 24, creates an axial seal under flow pressure having very little valve leakage.

Due to the axial bearing 49, which is located axially far from the flap 21 and is designed as a ball bearing, play-free axial support of the actuating shaft 40 comprising the flap 21 results, which also provides high control accuracy. High control accuracy is further increased by the rotary position sensor device comprising the sensor element 38 as part thereof. This has the advantage of direct sensing of the position of the flap 21 without the need for a coupling connected therebetween. The valve 10 so described is wear-free and robust in this embodiment. Moreover, a compact design results, which has a reduced number of components and, therefore, a lightweight, low-cost configuration.

The valve 10 is equipped with a failsafe device, which has a spring 51, e.g., in the form of a cylindrical coil spring. The spring is connected via one spring end 55 to the actuating shaft 40. The other spring end 56 is fixed at the rotary actuator housing 33. The one end 55 of the spring 51 is connected directly to the actuating shaft 40 via a driving element 52 and a lock-in element 53, e.g. in the form of a pin that is fixedly connected to the actuating shaft 40. The pin is inserted through a diametrical bore in the actuating shaft 40 and is secured therein.

The driving element 52 and the spring 51 are accommodated in a recess 54 contained in the fastening flange 17 of the housing 11. The recess 54 is approximately pot-shaped and is coaxial with respect to the actuating shaft 40. The arrangement is therefore designed such that the driving element 52, which is non-rotatably and axially coupled to the actuating shaft 40, and the failsafe spring 51 (preferably a cylindrical coil spring) are disposed in the housing 11 between same and the rotary actuator 31. As such, the spring 51 is accommodated and centered within the driving element 52 and is fixed via a spring end (e.g. the end 55), at the driving element 52, while another spring end (e.g., the spring end 56), is fixed at the rotary actuator housing 33. The spring 51 is centered via an approximately cylindrical guide part 57 thereof with respect to the rotary actuator housing 33, said guide part being overlapped by the end of the spring 51.

The driving element 52 (FIG. 3) is centered and held on the actuating shaft 40 via a central through-opening 58. The driving element 52 contains at least one lock-in opening. As shown, two diametrically opposed lock-in openings 59, 60 (e.g., in the form of a slot that is open toward the top in FIG. 3), into which a lock-in element 53 (e.g. in the form of pin), engages during installation with the actuating shaft 40 in a form-fit manner to rotationally drive the driving element 52. Torque is transferred between the actuating shaft 40 and the driving element 52 in this manner.

Figure 4:
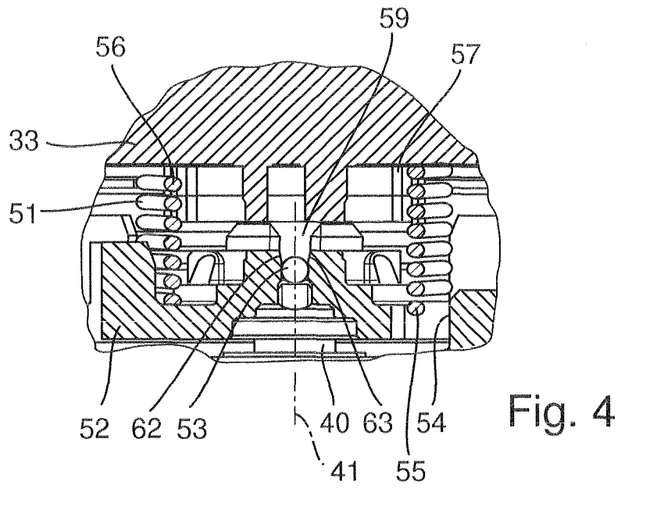
FIG. 4 shows a schematic sectional view of a detail from the valve depicted in FIG. 1.

Furthermore, the driving element 52 is axially coupled to the actuating shaft 40 by way of a clip connection 61. The clip connection 61 comprises lock-in elements 62, 63 (e.g., lock-in projections), with which the lock-in element 53 locks during assembly, with axial locking at the least. The driving element 52 is made of plastic, more particularly as a shaped plastic part. The lock-in elements 62, 63 are preferably elastic. During assembly, the lock-in element 53 can first be inserted via the slot-type lock-in openings 59, 60, which are located radially further inwardly, into the intermediate region thereof and, as the axial approach continues, enter the intermediate region between the lock-in elements 62 and 63 and then snap into position behind same (that is, behind the lock-in projections), as shown in FIG. 4. Such assembly establishes the axial connection between the driving element 52 and the lock-in element 53 of the actuating shaft 40.

Figure 3:
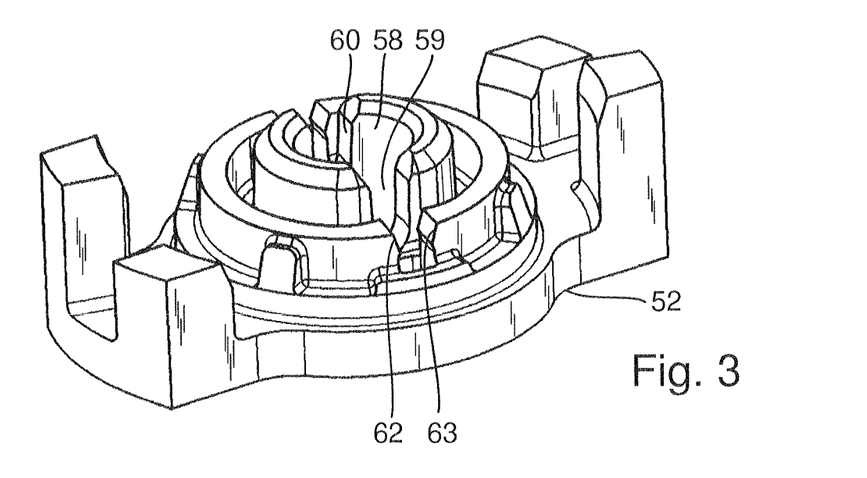
FIG. 3 shows a schematic perspective view of a driving element of the valve in FIG. 1.

The lock-in element 53 or pin overhangs on both sides beyond the diameter of the actuating shaft 40 radially far enough so that the slot-type lock-in openings 59, 60 can be traversed and, radially further outwardly, a lock-in engagement can take place between the lock-in elements 62, 63 on one side and corresponding lock-in elements on the diametrically opposite side. The intermediate region between the lock-in elements 62, 63 is also approximately slot-like, thereby permitting coupling to also take place in the circumferential direction.

Due to this configuration of the failsafe device, simple, rapid and reliable installation is achieved during assembly and, furthermore, a compact design is obtained.

Figure 6:
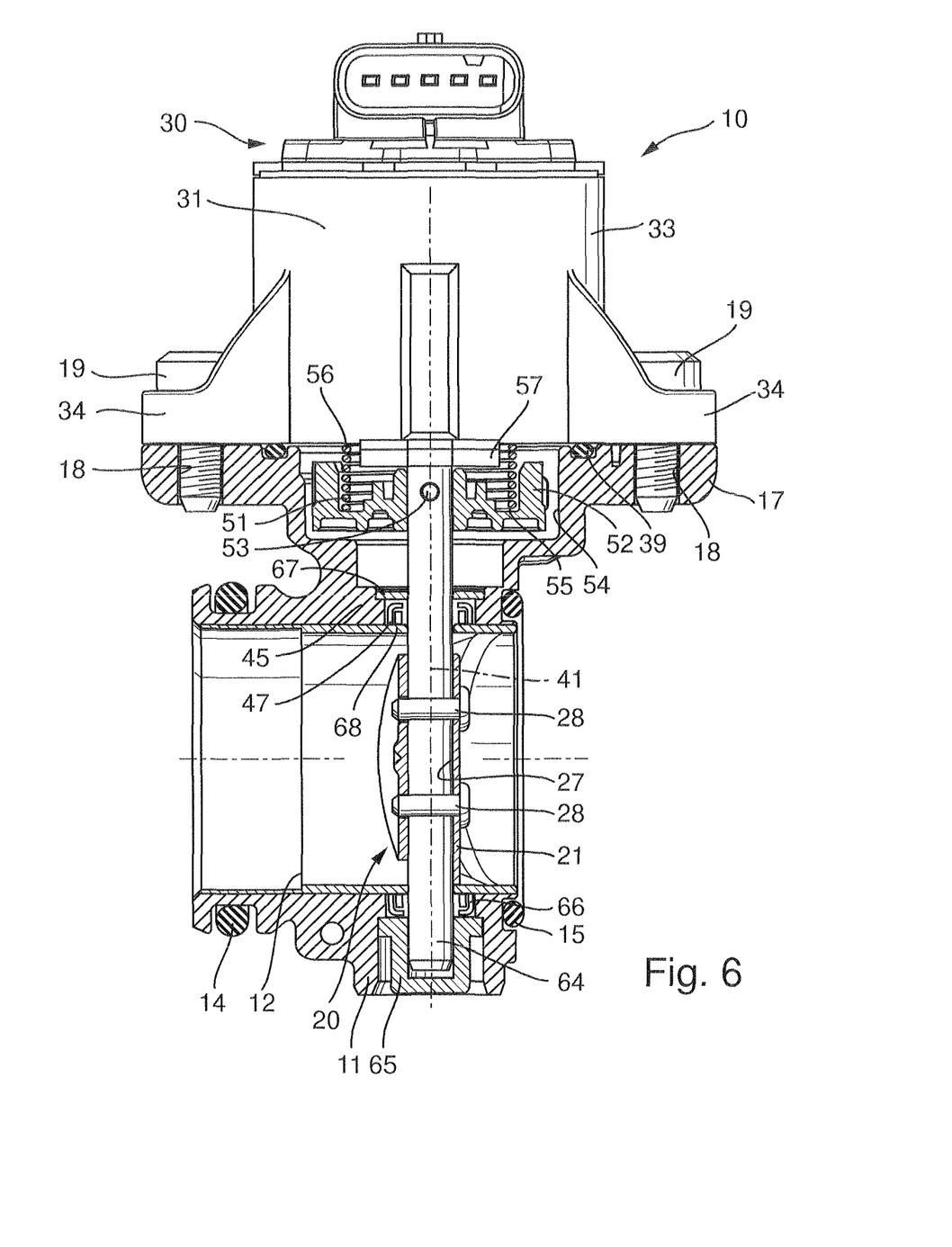
FIG. 6 shows a schematic sectional view another embodiment of a valve for exhaust gas recirculation.

In the alternative arrangement shown in FIG. 6, the same reference numerals are used for the components that correspond to the embodiment shown in FIGS. 1-5. To avoid repetition, reference is hereby made to the description of the embodiment of FIGS. 1-5.

In the valve 10 according to FIG. 6, a diametric bore 27 of the flap 21 is in the form of a diametrically continuous bore that is open at both ends. The actuating shaft 40 extends through the housing 11 on both sides of the flap 21 and is supported by way of a radial bearing 65 in the housing 11 via the shaft end 64. Shaft end 64 extends out of the flap 21 on the side thereof facing away from the rotary actuator 31. The radial bearing 65 may be formed as a sliding bearing or a pressed-in bushing. The radial bearing 65 is advantageously sealed in the housing 11 toward the channel section 12 by way of a sealing ring 66, which is preferably made of peroxide-cured plastic. Another similar sealing ring 47 is provided for sealing on the opposite side of the flap 21. A washer 67 adjoins same, e.g. for support.

In the FIG. 6 embodiment, the channel section 12 of valve 10 comprises, at least in the region of the valve element 20 in the form of the flap 21, a tube lining 68. Tube lining 68 is fixedly connected to the housing 11, is made of stainless steel and is used as corrosion protection for the housing 11. The tube lining 68 comprises the axial stop surfaces as shown in FIGS. 1 to 5, but which are not shown in FIG. 6. It is understood that such a tube lining 68 can also be provided in the valve 10 according to embodiment depicted in FIGS. 1 to 5. Due to the tube lining 68 (which is preferably made of stainless steel) a low-cost diecast part (preferably an aluminum diecast part) can be used for the housing 11. Such housing is thereby improved with respect to corrosion protection in a simple and low-cost manner by way of the stainless steel tube lining 68. During manufacture of the housing 11, the tube lining 68, which is shaped as a cylindrical sleeve, is inserted into the mold that is used and is enclosed via injection molding using the diecast material. Next, said crude housing is machined by producing the axial stop surfaces 23 and 24 and in other manners such that the configuration according to FIG. 6 results.

In the valve according to the FIG. 6 embodiment, the actuating shaft 40 is supported on both sides of the valve element 20 in the form of the flap 21. The flap 21 comprises a radial bearing corresponding to the radial bearing 48 in the rotary actuator 31 and by the radial bearing 65 located in the lower part of the housing 11 in the shaft end 64. Due to the radial support of the actuating shaft 40 at both ends, greater loads and, therefore, greater differential pressures are possible. It is furthermore advantageous that greater assembly forces at the shaft end 64 are possible due to the lower radial bearing 65. For example, the valve element 20, more particularly in the form of the flap 21, can be calibrated in the housing 11. The strength and stiffness of the valve 10 is thereby increased.

As will be evident to persons skilled in the art, the foregoing detailed description and figures are presented as examples of the invention, and that variations are contemplated that do not depart from the fair scope of the teachings and descriptions set forth in this disclosure. The foregoing is not intended to limit what has been invented, except to the extent that the following claims so limit that.

What is claimed is:
1. A low pressure valve for controlling exhaust gas recirculation in an internal combustion engine comprising:
 a valve housing configured with a channel section for exhaust gas guidance and a valve element for controlling an exhaust gas passage in the channel section; and
 an actuating drive in a form of an electromagnetic rotary actuator that is configured for adjusting the valve element and comprises a rotary actuator housing, a coil and a rotor;
 wherein the rotary actuator housing is mounted on the valve housing;
 wherein the actuating drive comprises a one-piece element, the one-piece element having a first section embodying a drive shaft and a second section embodying an actuating shaft;
 wherein the drive shaft is arranged in the rotary actuator housing and is non-rotatably connected to the rotor;
 wherein the actuating shaft is an extension of the drive shaft such that the actuating shaft extends continuously to the drive shaft, is routed in an extended manner out of the rotary actuator housing, is supported via an end section of the drive shaft contained in the rotary actuator housing and protrudes into the valve housing transversely to a flow direction in the channel section;
 wherein the actuating shaft engages in the valve housing at the valve element in a non-rotatable manner and is rotationally adjusted about an axis in order to actuate the valve element;
 wherein the valve element is formed of a circular flap having edge regions on both sides of an axis of the actuating shaft;
 wherein the valve housing comprises axial stop surfaces that are planar and face the flow direction in the channel section;
 wherein the circular flap, in a closed position, is positioned transversely to the channel section and bears against the axial stop surfaces via the edge regions;
 wherein the end section of the drive shaft is supported by a radial bearing and by an axial bearing;
 wherein the radial bearing and the axial bearing both are arranged in the rotary actuator housing; and
 wherein the axial bearing is a ball bearing that is arranged between the coil and the rotor of the electromagnetic rotary actuator.

2. The valve according to claim 1, wherein the actuating shaft is supported in the valve housing in only one radial bearing disposed in the valve housing, as viewed along the axis, on one side of the flap and at a distance therefrom.

3. The valve according to claim 1, further comprising a contactless rotary position sensor device for direct sensing the position of the flap, wherein the contactless rotary position sensor device comprises a sensor element fixedly connected to the drive shaft.

4. The valve according to claim 1, wherein the flap contains a diametrically extending bore, in which an assigned end region of the actuating shaft is accommodated.

5. The valve according to claim 1, wherein the flap is fastened via one or more fastening means at the actuating shaft, which fastening means are directed transversely to the axis and extend through transversely extending bores in the actuating shaft and in the flap.

6. The valve according to claim 1, wherein the actuating shaft extends through the valve housing only in a valve housing region located between the flap and the rotary actuator, and wherein the actuating shaft extends together with the flap into the channel section.

7. The valve according to claim 4, wherein the diametric bore is in the form of a blind-hole bore.

8. The valve according to claim 4, wherein the diametric bore of the flap is in the form of a diametrically continuous bore that is open at both ends.

9. The valve according to claim 8, wherein the actuating shaft extends through the valve housing on both sides of the flap and is supported by way of a radial bearing in the valve housing via an actuating shaft end, and wherein the actuating shaft end extends out of the flap on the side thereof facing away from the rotary actuator.

10. The valve according to claim 2, wherein the radial bearing is sealed in the valve housing toward the channel section by way of a sealing ring made of a peroxide-cured plastic.

11. The valve according to claim 1, wherein a driving element is non-rotatably and axially coupled to the actuating shaft and, a failsafe spring formed as a cylindrical coil spring, are disposed in the valve housing between same and the rotary actuator, and wherein the failsafe spring is accommodated and centered within the driving element and fixed via a spring end at the driving element while another spring end is fixed at the rotary actuator housing.

12. The valve according to claim 11, wherein a lock-in element is fastened at the actuating shaft and engages in a form-fit manner in an axial lock-in opening of the driving element in order to rotationally drive the driving element.

13. The valve according to claim 12, wherein the driving element is axially coupled to the actuating shaft by way of a clip connection.

14. The valve according to claim 13, wherein the clip connection comprises lock-in elements, formed as lock-in projections that interact with the lock-in element and are radially separated with respect to the lock-in opening and with which the lock-in element axially locks during assembly.

15. The valve according to claim 11, wherein the failsafe spring is centered via a substantially cylindrical guide part thereof with respect to the rotary actuator housing, and wherein the guide part is overlapped by the spring.

16. The valve according to claim 1, wherein the valve housing comprises a fastening flange and the rotary actuator housing comprises fastening tabs that are connected to one another by fastening means extending therethrough.

17. The valve according to claim 16, wherein the fastening flange of the valve housing contains a recess that is coaxial with respect to the actuating shaft and wherein the driving element and the failsafe spring are accommodated by the recess.

18. The valve according to claim 1, wherein the flap comprises a circumferential lip with a smaller cross-sectional thickness on an outer edge, by way of which the flap axially bears in the closed position against the axial stop surfaces of the valve housing in a sealing manner.

19. The valve according to claim 1, wherein the axial stop surfaces of the valve housing are contained within a plane that extends obliquely at an acute angle with respect to a diagonal of the channel section.

20. The valve according to claim 1, wherein the channel section comprises a tube lining made of stainless steel that is fixedly connected to the valve housing as corrosion protection and which comprises the axial stop surfaces.

21. The valve according to claim 1, wherein the valve housing is formed as an aluminum diecast part.

22. The valve according to claim 1, wherein the flap is formed of a precision-cast part made of stainless steel.

23. A low pressure valve for controlling exhaust gas recirculation in an internal combustion engine comprising:
a valve housing configured with a channel section for exhaust gas guidance and a valve element for controlling an exhaust gas passage in the channel section; and
an actuating drive in a form of an electromagnetic rotary actuator that is configured for adjusting the valve element and comprises a rotary actuator housing, a coil and a rotor;
wherein the rotary actuator housing is mounted on the valve housing;
wherein the actuating drive comprises one single shaft configured to operate as a drive shaft and as an actuating shaft;
wherein the drive shaft is arranged in the rotary actuator housing and is non-rotatably connected to the rotor;
wherein the actuating shaft extends continuously to the drive shaft;
wherein the actuating shaft is routed in an extended manner out of the rotary actuator housing and is supported via an end section of the drive shaft contained in the rotary actuator housing:
wherein the actuating shaft protrudes into the valve housing transversely to a flow direction in the channel section;
wherein the actuating shaft acts in a non-rotatable manner on the valve element in the valve housing and is rotationally adjusted about an axis in order to actuate the valve element;
wherein the valve element is formed of a circular flap having edge regions on both sides of an axis of the actuating shaft;
wherein the valve housing comprises axial stop surfaces are planar and face the flow direction in the channel section;
wherein the circular flap, in a closed position, is positioned transversely to the channel section and bears against the axial stop surfaces via the edge regions;
wherein the end section of the drive shaft is supported by a radial bearing and by an axial bearing;
wherein the radial bearing and the axial bearing both are arranged in the rotary actuator housing; and
wherein the axial bearing is arranged between the coil and the rotor of the electromagnetic actuator.

24. A low pressure valve for controlling exhaust gas recirculation in an internal combustion engine comprising:
a valve housing configured with a channel section for exhaust gas guidance and a valve element for controlling an exhaust gas passage in the channel section; and
an actuating drive in a form of an electromagnetic rotary actuator that is configured for adjusting the valve element and comprises a rotary actuator housing;
wherein the rotary actuator housing is mounted on the valve housing;
wherein the actuating drive comprises a one-piece drive and actuating shaft comprising a drive shaft section and an actuating shaft section;
wherein the drive shaft section is arranged in the rotary actuator housing;
wherein the actuating shaft section extends continuously to the drive shaft section;
wherein the actuating shaft section is routed in an extended manner out of the rotary actuator housing and is supported via an end section of the drive shaft section contained in the rotary actuator housing;
wherein the actuating shaft section and protrudes into the valve housing transversely to a flow direction in the channel section;
wherein the actuating shaft section acts in a non-rotatable manner on the valve element in the valve housing and is rotationally adjusted about an axis in order to actuate the valve element;
wherein the valve element is formed of a circular flap having edge regions on both sides of an axis of the actuating shaft section;
wherein the valve housing comprises axial stop surfaces are planar and face the flow direction in the channel section;

wherein the circular flap, in a closed position, is positioned transversely to the channel section and bears against the axial stop surfaces via the edge regions wherein the end section of the drive shaft section is supported by a radial bearing and by an axial bearing; and wherein the radial bearing and the axial bearing both are arranged in the rotary actuator housing.

* * * * *